March 18, 1958  R. B. HORSFALL, JR., ET AL  2,827,602
SHAFT POSITIONING DEVICE
Filed Feb. 8, 1955
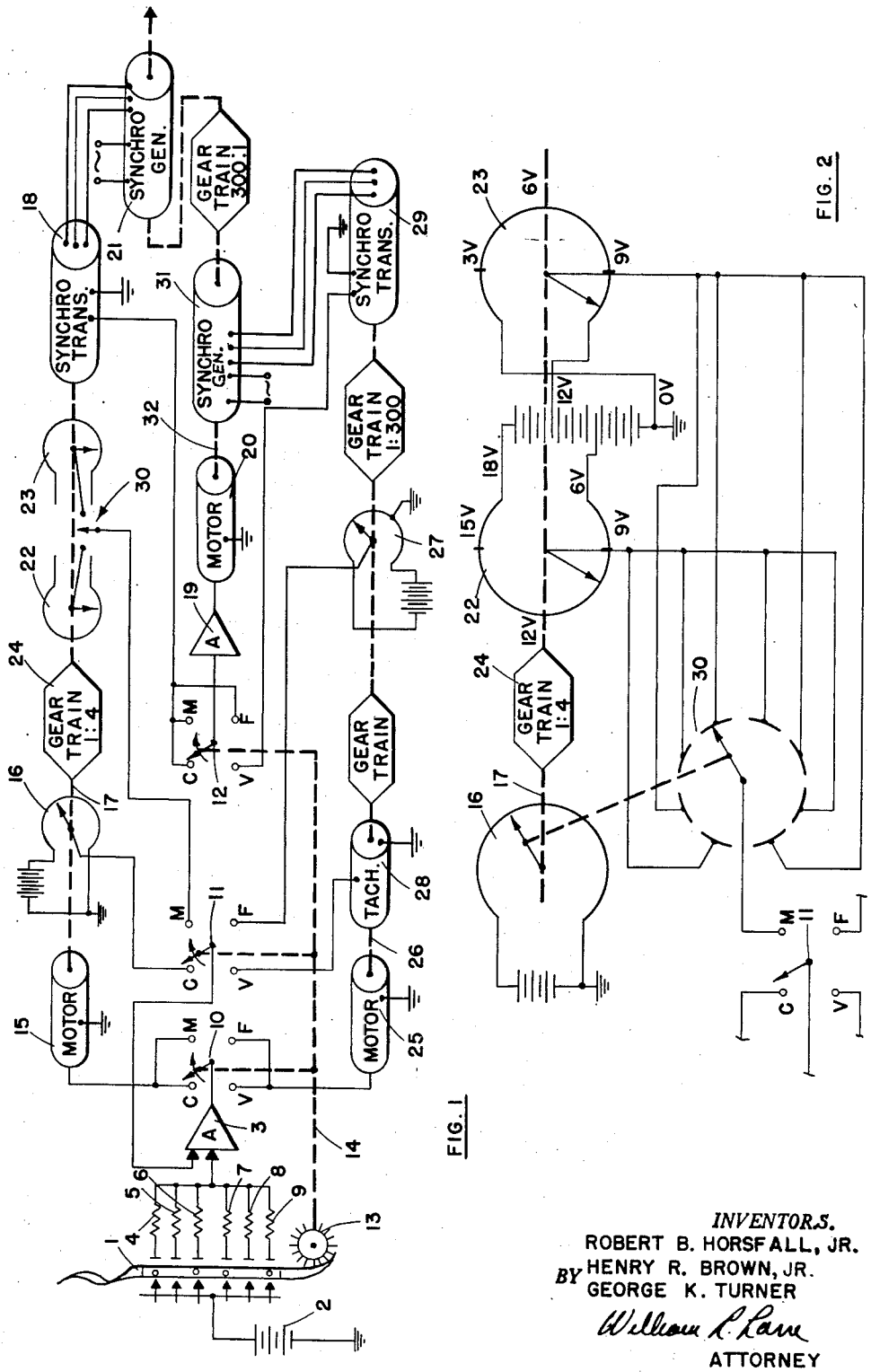
INVENTORS.
ROBERT B. HORSFALL, JR.
HENRY R. BROWN, JR.
GEORGE K. TURNER
BY William R. Lane
ATTORNEY United States Patent Office 2,827,602
Patented Mar. 18, 1958

2,827,602

SHAFT POSITIONING DEVICE

Robert B. Horsfall, Jr., and Henry R. Brown, Jr., Whittier, Calif., and George K. Turner, Huntsville, Ala., assignors to North American Aviation, Inc.

Application February 8, 1955, Serial No. 486,792

9 Claims. (Cl. 318—28)

This invention is a shaft positioning device, that is, it provides a precise shaft position and velocity in accordance with a signal input which is compactly stored on a tape.

To accomplish the shaft positioning, this device provides for a coarse adjustment of the shaft position followed by a medium adjustment, then a fine adjustment, and, finally, rotates the shaft at a desired velocity. In the field of automatic controls, both in production and in information handling, it may be desirable to obtain a precise shaft rotation both as to position and velocity in accordance with input information, particularly, if the information is in a coded form that can be efficiently stored. Closed loop servo circuits which provide for accurate control of shaft rotation are generally limited in their capabilities and usually require a continuous flow of input information. If designed to provide several shaft rotations, difficulty can be expected in the accuracy of shaft positioning. If designed to provide accurate shaft position, the speed at which the shaft may be rotated to its new position may suffer. In addition, servos designed to provide accurate shaft positioning are not satisfactory as devices to accurately rotate the shaft at a given velocity after having reached its given position.

This invention contemplates utilizing shaft position and velocity information which has been previously encoded in distinguishable groups of information. For instance, information as to the coarse setting of the shaft is arranged to enter the system; next, medium positioning information is arranged to enter the system; thirdly, fine positioning information is arranged to enter the system; and fourthly, velocity information is arranged to enter the system. As a practical matter, this information may be considered to be recorded on tape magnetically or by means of punched holes. The first frame of the tape may indicate the coarse positioning of the given shaft, the second frame of the tape indicating the medium position of the shaft, the third frame indicating the fine positioning, and the fourth frame indicating the speed at which the shaft is to be rotated after positioning. As the first frame lies under the reading head of the system, the shaft is positioned coarsely. As the second frame falls under the reading heads, the shaft is positioned to a medium accuracy, and as the third frame falls under the heads, the shaft is accurately positioned. Then, as the fourth frame falls under the reading head, the shaft is driven at the velocity indicated in the fourth frame.

It is therefore an object of this invention to provide accurate shaft angle of rotation and velocity of rotation.

It is another object of this invention to provide a system of positioning and rotating a shaft in accordance with previously compiled data.

It is another object of this invention to provide a shaft positioning mechanism which may be rotated many turns to a precise position.

It is another object of this invention to provide a servo shaft positioning device which is continuously rotatable.

It is another object of this invention to provide a shaft positioning and drive device which is continuously servo controlled.

Other objects of invention will become apparent from the following description, taken in connection with the accompanying drawings, in which:

Fig. 1 is a schematic diagram of the device; and

Fig. 2 is a representative, continuously rotatable potentiometer device.

Referring to Fig. 1, a punched tape 1 passing through the read head of a tape reading device allows several mating pairs of contacts to come in contact and others to be insulated from each other. As a result, a certain current is developed by source 2 as the input to servo amplifier 3 which is a difference amplifier. The relative values of the resistors 4, 5, 6, 7, 8 and 9 are dependent on the relative values of the hole locations on the tape. Through the structure of capstan drive wheel 13 and mechanical linkage 14, switches 10, 11, and 12 are rotated to a succeeding position each time the tape progresses to a succeeding frame. At the beginning, all switches are connected in "C" position. The output of amplifier 3 is first connected to drive motor 15 through switch 10 in accordance with the signal received from the coarse frame of tape 1. A pickoff device such as a potentiometer 16 driven by the shaft of motor 15 is positioned according to the rotation of motor 15. The feedback from the wiper of potentiometer 16 into amplifier 3 provides a closed loop. Difference amplifier 3 thus provides a signal output until the feedback voltage from potentiometer 16 equals the input voltage from the resistors 4, 5, 6, etc., which will indicated that shaft 17 is properly positioned. It can be readily understood that potentiometer 16 is constructed with a minimum of "dead" spot. If desirable, a complete 360° potentiometer device, as explained hereinafter in Fig. 2, may be utilized. According to the original signal received at amplifier 3, shaft 17 is, at the same time, rotating a synchro transformer 18 which is driving an amplifier 19 and a synchro motor 20 which rotates shaft 32. A synchro generator 21 is also located upon the shaft of motor 20 and provides a feedback signal to synchro transformer 18. Coarse positioning is thus accomplished.

When tape 1 is advanced to the next frame, a medium adjustment frame, the shaft switches 10, 11, and 12 are all turned to the "M" position. Motor 15 drives shaft 17 according to the error signal received by amplifier 3. The wipers of potentiometers 22 and 23 are driven according to the rotation of shaft 17 through gear train 24 and, being on the high speed end of the shaft, indicate the medium adjustment of the shaft which indication is fed back through switch 11 to amplifier 3. When the shaft is in proper position, amplifier 3 receives no error signal, the current from potentiometer 22 or 23 equalling and cancelling the current from the resistor group. A particular circuit configuration used for potentiometers 22 and 23 is described hereinafter in Fig. 2. It is desirable that these potentiometers be capable of continuous rotation through 360° and that no dead spots occur no matter how many times they have been rotated. Synchro transformer 18 operates, as previously described, to drive amplifier 19 and motor 20, producing a medium adjustment of the rotation of output shaft 32.

As the tape is advanced again, to the fine positioning frame, by capstan 13, switches 10, 11 and 12 are advanced to the "F" position. Amplifier 3 is now connected to drive motor 25 which rotates shaft 26 and adjusts the wiper of potentiometer 27. According to the rotation of shaft 26, feedback from the wiper of potentiometer 27 occurs through switch 11 to amplifier 3. It is to be understood that potentiometer 27, like potentiometer 16, is constructed with a minimum of "dead" spot by making it as near to a 360° potentiometer as can be done. It is noted that because of the connection of the "F" contact on switch 12, the closed loop circuit for the output shaft of motor 20 is through synchro transformer 18 and transmitter 21. Thus, shaft 32 is held at the "medium" positioning. This allows shaft 26 to reach the "fine" position first before having shaft 32 controlled thereby.

Assume now that capstan 13 drives tape 1 to the velocity frame, switches 10, 11, and 12 are all connected to position "V" from which the output shaft 32 of motor 20 is to attain a certain velocity according to the input to amplifier 3. The first thing that happens is that shaft 32 "locks in" (becomes positioned "fine") with shaft 26. Then the shafts move in synchronism at the prescribed velocity. A tachometer 28, such as a capacitor tachometer, is now connected to provide feedback to amplifier 3 to servo control motor 25. Also during this interval, switch 12 is closed so that synchro transformer 29 drives amplifier 19 and motor 20. Synchro transmitter 31 connected to motor 20 provides feedback to synchro transformer 29 to provide closed loop servo control of the output of motor 20. Thus, the output shaft 32 of motor 20 is servo positioned and then servo driven.

Potentiometers 22 and 23 are specially connected to provide a continuously rotatable potentiometer reading regardless of the final position or number of rotations. If one potentiometer were used in this position, it is apparent that at some position of rotation a dead spot would occur at which no potentiometer reading would be obtained. Therefore, it is desirable that two potentiometers be utilized in order that one supplements the other. In Fig. 2, potentiometer 16 upon shaft 17 is shown as driving potentiometers 22 and 23 through gear train 24. A switch 30, having commutating segments, is driven by shaft 17 the same as potentiometer 16. Depending on the ratio of gear reducer 24, switch 30 is adapted to shift the reading from potentiometer 22 to potentiometer 23 at prescribed intervals. If the gear ratio is 1:4 as illustrated, switch 30 will be divided into eight sections, each quadrant of the switch containing two commutating segments so that potentiometer 22 is first used as a position indicator and then potentiometer 23 is used as a position indicator. In this manner, in the medium positioning scheme illustrated in Fig. 1, no dead spots occur in the potentiometer feedback loop to amplifier 3.

Although the invention has been described and illustrated in detail, it is to be clearly understood that the same is by way of illustration and example only and is not to be taken by way of limitation, the spirit and scope of this invention being limited only by the terms of the appended claims.

We claim:

1. In a shaft positioning mechanism to which is provided individual groups of input signals as to shaft rotation to differing degrees of fineness, a shaft, servo means connected to drive said shaft in accordance with said input signals, a plurality of pickoff devices indicating the rotation of said shaft to differing degrees of fineness, switch means operated to selectively connect said pickoff devices in a feedback loop to said servo means in synchronism with the individual groups of information received by said servo means.

2. The combination recited in claim 1 wherein at least one of said pickoff devices indicates the velocity of rotation of said shaft.

3. In a shaft positioning mechanism to which is provided individual groups of input signals as to shaft position to differing degrees of fineness, a shaft, servo means connected to drive said shaft in accordance with said input signals, a plurality of pickoff devices indicating the angle of rotation of said shaft to differing degrees of fineness, switch means operated to selectively connect said pickoff devices in a feedback loop to said servo means in synchronism with the individual groups of information received by said servo means.

4. In a shaft positioning mechanism means providing in time sequence groups of input signals as to shaft rotation to increasing degrees of fineness, a shaft, servo means connected to drive said shaft in accordance with said input signals, a plurality of pickoff devices indicating the rotation of said shaft to differing degrees of fineness, switch means operated to connect in time square, and in order of increasing fineness said pickoff devices in feedback loop to said servo means.

5. In a shaft positioning mechanism, a recording medium providing previously recorded signals as to shaft rotation in successive groups of increasing degrees of fineness, a shaft, servo means connected to drive said shaft in accordance with said signals, a plurality of pickoff devices indicating the rotation of said shaft to differing degrees of fineness, switch means synchronized with the advance of said recording medium to connect said pickoff devices in feedback loop to said servo means in order of increasing fineness.

6. The combination recited in claim 5 wherein at least one of said groups of signals provides velocity of rotation information, and at least one of said pickoff devices indicates velocity of rotation of said shaft.

7. In a shaft positioning mechanism, a recording medium providing previously recorded signals as to angle of shaft rotation in successive groups of increasing degrees of fineness and a signal of velocity of shaft rotation, a shaft, servo means connected to drive said shaft in accordance with said signals, a plurality of potentiometers rotated by said shaft at differing ratios, a tachometer connected to be rotated by said shaft, switch means operated by the advance of said recording medium so as to connect selectively said potentiometers and said tachometer in a feedback loop to said servo means.

8. In a shaft positioning mechanism, a recording medium providing previously recorded signals as to coarse, medium, fine and velocity shaft positioning signals in successive groups, a first shaft, first servo means connected to drive said first shaft in accordance with said signals and feedback information, a coarse potentiometer rotated by said shaft, a medium potentiometer rotated at higher speeds by said shaft, a second shaft, second servo means connected to drive said second shaft in accordance with said signals and feedback information, a fine potentiometer rotated by said second shaft, an output shaft, third servo means for controlling the rotation of said output shaft in accordance with said first and said second shafts alternatively, and switch means operated by the advance of said recording medium so as to connect selectively said potentiometers and said tachometer in a feedback loop to said first and second servo means, and to connect selectively said third servo means to follow said first and second shafts.

9. In a shaft positioning mechanism, a recording medium providing previously recorded signals as to coarse, medium, fine and velocity shaft positioning signals in successive groups, a first shaft, first servo means connected to drive said first shaft in accordance with said signals and feedback information, a coarse potentiometer rotated by said shaft, a medium potentiometer rotated at higher speeds by said shaft, a first synchro transformer rotated by said shaft, a second shaft, second servo means connected to drive said second shaft in accordance with said signals and feedback information, a fine potentiometer rotated by said second shaft, a tachometer rotated by said second shaft, a second synchro transformer rotated by said second shaft, an output shaft, a coarse synchro transmitter connected to said first synchro transformer and rotated by said output shaft, a fine synchro transmitter connected to said second synchro transformer and rotated by said output shaft at a higher speed then said coarse synchro transmitter, third servo means for controlling the rotation of said output shaft in accordance with the outputs of said first and second synchro transformers alternatively, switch means operated at the advance of said recording medium so as to connect selectively said potentiometers and said tachometer in a feedback loop to said first and second servo means, and to connect alternatively said third servo means to said first and second synchro transformers.

References Cited in the file of this patent

UNITED STATES PATENTS 2,560,337   Fouassin _____ July 16, 1951

U. S. DEPARTMENT OF COMMERCE
PATENT OFFICE

CERTIFICATE OF CORRECTION

Patent No. 2,827,602    Robert B. Horsfall, Jr., et al.      March 18, 1958

It is hereby certified that error appears in the printed specification of the above numbered patent requiring correction and that the said Letters Patent should read as corrected below.

Column 4, line 9, for "square" read -- sequence --.

Signed and sealed this 3rd day of June 1958.

(SEAL)
Attest:

KARL H. AXLINE
Attesting Officer

ROBERT C. WATSON
Commissioner of Patents